(12) United States Patent
Higashino

(10) Patent No.: US 8,446,686 B2
(45) Date of Patent: May 21, 2013

(54) INFORMATION STORAGE APPARATUS, SERVO PATTERN FORMATION CONTROL APPARATUS, AND RECORDING MEDIUM

(75) Inventor: Yoshinari Higashino, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 893 days.

(21) Appl. No.: 12/571,074

(22) Filed: Sep. 30, 2009

(65) Prior Publication Data
US 2010/0123972 A1   May 20, 2010

(30) Foreign Application Priority Data

Nov. 18, 2008  (JP) .................................. 2008-294462

(51) Int. Cl.
*G11B 20/12* (2006.01)
(52) U.S. Cl.
USPC .......................................................... 360/55
(58) Field of Classification Search .................... 360/55
See application file for complete search history.

(56) References Cited

U.S. PATENT DOCUMENTS

| | | | |
|---|---|---|---|
| 5,668,679 A | 9/1997 | Swearingen et al. | |
| 6,035,351 A | 3/2000 | Billings et al. | |
| 6,327,112 B1 * | 12/2001 | Ide et al. | 360/78.04 |
| 6,816,330 B2 * | 11/2004 | Ikeda et al. | 360/59 |
| 7,145,744 B1 | 12/2006 | Clawson et al. | |
| 7,355,805 B2 * | 4/2008 | Nakao et al. | 360/48 |
| 7,443,625 B2 * | 10/2008 | Hamaguchi et al. | 360/55 |
| 7,602,578 B2 * | 10/2009 | Tateishi et al. | 360/77.12 |
| 7,864,473 B2 * | 1/2011 | Ogawa et al. | 360/55 |

FOREIGN PATENT DOCUMENTS

| | | |
|---|---|---|
| JP | A 61-59671 | 3/1986 |
| JP | A 7-220404 | 8/1995 |
| JP | A 10-312647 | 11/1998 |
| JP | 2008-159222 | 7/2008 |

* cited by examiner

*Primary Examiner* — Mark Blouin
(74) *Attorney, Agent, or Firm* — Greer, Burns & Crain, Ltd.

(57) ABSTRACT

According to one embodiment, an information storage apparatus, includes: a recording medium with a first servo pattern having absolute position information and a second servo pattern having relative position information; a record reproducing head; a standard position detector calculating a standard position of the second servo pattern where an absolute position on the recording medium is specified, from a positional relationship between the first servo pattern and the second servo pattern; a head position controller positioning the record reproducing head in a target position on the recording medium, using the absolute position information of the first servo pattern, the standard position, and the relative position information of the second servo pattern; and a record signal generator generating a record signal to record a third servo pattern having absolute position information on the recording medium in the target position by the record reproducing head.

8 Claims, 8 Drawing Sheets

INFORMATION STORAGE APPARATUS, SERVO PATTERN FORMATION CONTROL APPARATUS, AND RECORDING MEDIUM

CROSS-REFERENCE TO RELATED APPLICATIONS

This application is based upon and claims the benefit of priority from Japanese Patent Application No. 2008-294462, filed on Nov. 18, 2008, the entire contents of which are incorporated herein by reference.

BACKGROUND

1. Field

One embodiment of the invention relates to an information storage apparatus, a servo pattern formation control apparatus, and a recording medium.

2. Description of the Related Art

In information storage apparatuses such as magnetic disk apparatuses, servo patterns that are used for positioning control of a record reproducing head are formed on a recording medium, such as a magnetic disk. An information storage apparatus uses the servo patterns read by the record reproducing head to position the record reproducing head in a target data track on a recording medium.

In general, the servo patterns that are formed on the recording medium are formed radially from the inside of the recording medium to the outside thereof. As another shape of the servo patterns, the servo patterns may be formed in a spiral shape and a concentric circle shape connected to the spiral shape (for example, see Japanese Patent Application Publication (KOKAI) No. S61-59671).

The servo patterns are formed on the recording medium using a process called servo track writing (STW). For example, a method that magnetically records the servo patterns on the entire surface of the recording medium by external STW equipment needs a large amount of time during a write operation, and needs the external STW equipment for a long time. Accordingly, an equipment investment cost of the external STW equipment may be increased.

In order to decrease the equipment investment cost of the external STW equipment, a method that magnetically writes servo patterns by a record reproducing head of an information storage apparatus has been suggested (for example, see U.S. Pat. No. 5,668,679 and U.S. Pat. No. 7,145,744). According to the method, a spiral servo pattern is formed by the record reproducing head of the information storage apparatus, and a radial servo pattern is formed using the spiral servo pattern.

In the method that forms the servo patterns using the spiral servo pattern as a reference, since the spiral servo pattern does not have absolute position information on the recording medium, an absolute position on the recording medium cannot be specified directly from the spiral servo pattern. Hence, it is difficult to specify a write start position of the servo patterns.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information storage apparatus, includes: a recording medium configured to include a first servo pattern having absolute position information on the recording medium and a second servo pattern having relative position information on the recording medium; a record reproducing head configured to record information on and reproduce information from the recording medium; a standard position detector configured to calculate a standard position of the second servo pattern where an absolute position on the recording medium is specified, from a positional relationship between the first servo pattern and the second servo pattern; a head position controller configured to position the record reproducing head in a target position on the recording medium, using the absolute position information of the first servo pattern, the standard position, and the relative position information of the second servo pattern; and a record signal generator configured to generate a record signal to record a third servo pattern having absolute position information on the recording medium in the target position by the record reproducing head.

According to another embodiment of the invention, a servo pattern formation control apparatus, includes: a standard position detector configured to calculate, from a positional relationship between a first servo pattern having absolute position information on a recording medium and a second servo pattern having relative position information on the recording medium, which are formed on the recording medium, a standard position of the second servo pattern where an absolute position on the recording medium is specified; a head position controller configured to position a record reproducing head, which records information on and reproduces information from the recording medium, in a target position on the recording medium, using the absolute position information of the first servo pattern, the standard position, and the relative position information of the second servo pattern; and a record signal generator configured to generate a record signal to record a third servo pattern having absolute position information on the recording medium in the target position by the record reproducing head.

According to still another embodiment of the invention, a recording medium, includes: a first servo pattern having absolute position information on the recording medium; and a second servo pattern having relative position information on the recording medium and a spiral shape.

Hereinafter, as an information storage apparatus according to an embodiment of the invention, a magnetic disk apparatus 100 will be described.

Figure 1:
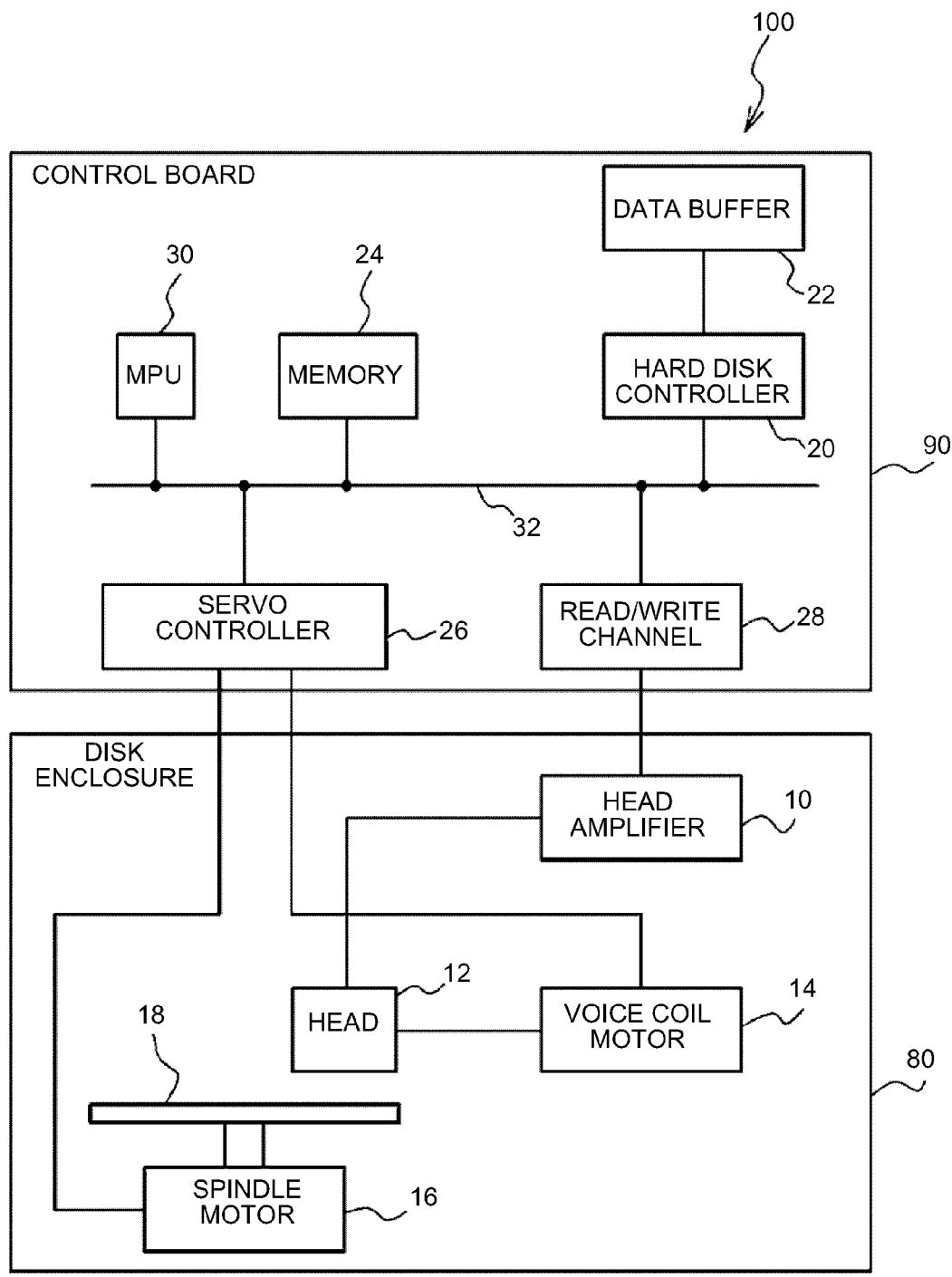
FIG. 1 is an exemplary block diagram of a magnetic disk apparatus according to an embodiment of the invention.

FIG. 1 is a block diagram of a magnetic disk apparatus 100 according to an embodiment of the invention. As illustrated in FIG. 1, the magnetic disk apparatus 100 includes a control board 90 and a disk enclosure 80.

The disk enclosure 80 includes a head amplifier 10, a head 12, a voice coil motor 14, a spindle motor 16, and a magnetic disk 18 as a recording medium.

The head amplifier 10 receives data from a read/write channel 28, transmits the data to the head 12 (recording element), and transmits data read by the head 12 (reproducing element) to the read/write channel 28.

The head 12 includes a recording element that writes data in or erases data from the magnetic disk 18 and a reproducing element that reads the written data, which are provided in a body made of a ceramic material. That is, user data or a third servo pattern 64 to be described in detail below is written by the head 12, and a first servo pattern 34, a second servo pattern 36, the third servo pattern 64, and the user data are read by the head 12.

The voice coil motor 14 drives a head stack assembly (HSA) holding the head 12, under the control of a servo controller 26, and positions the head 12 in a predetermined position on the magnetic disk 18.

The spindle motor 16 rotates the magnetic disk 18 at an appropriate rotation speed of, for example, 4200 to 15000 rpm, under the control of the servo controller 26.

Figure 2:
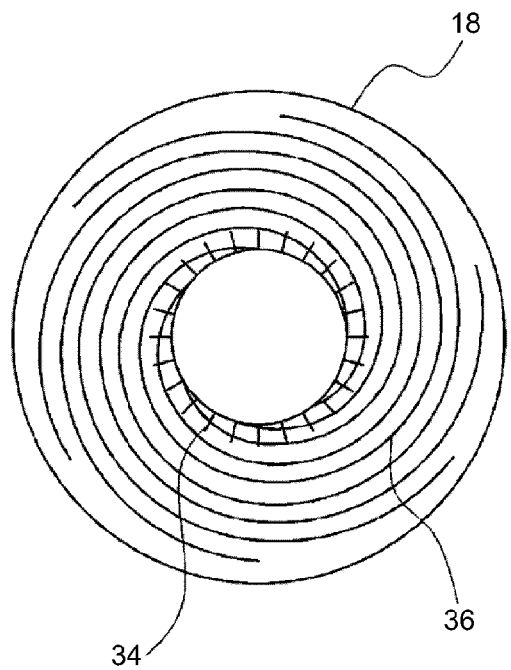
FIG. 2 is an exemplary schematic diagram for explaining a magnetic disk used in the magnetic disk apparatus in the embodiment.

The magnetic disk 18 is a recording medium that stores data by varying a magnetization state of a magnetic material. On the magnetic disk 18, servo patterns that are used for positioning control of the head 12 at the time of recording/reproducing the user data are formed. In the embodiment, the servo patterns used at the time of recording/reproducing the user data are not formed on the magnetic disk 18 that is just set to the disk enclosure 80 and in an initial state, and the patterns illustrated in FIG. 2 are instead being formed. In FIG. 2, the magnetic disk 18 includes the first servo pattern 34 that is provided in an internal area of the magnetic disk 18, and the second servo pattern 36 that is spirally provided on the entire surface of the magnetic disk 18. The first servo pattern 34 and the second servo pattern 36 are previously formed by an external STW equipment before the magnetic disk 18 is set to the disk enclosure 80. The first servo pattern 34 may be formed in an area other than the internal area of the magnetic disk 18. For example, the first servo pattern 34 may be formed in an external area or in both the internal area and the external area.

Figure 3A:
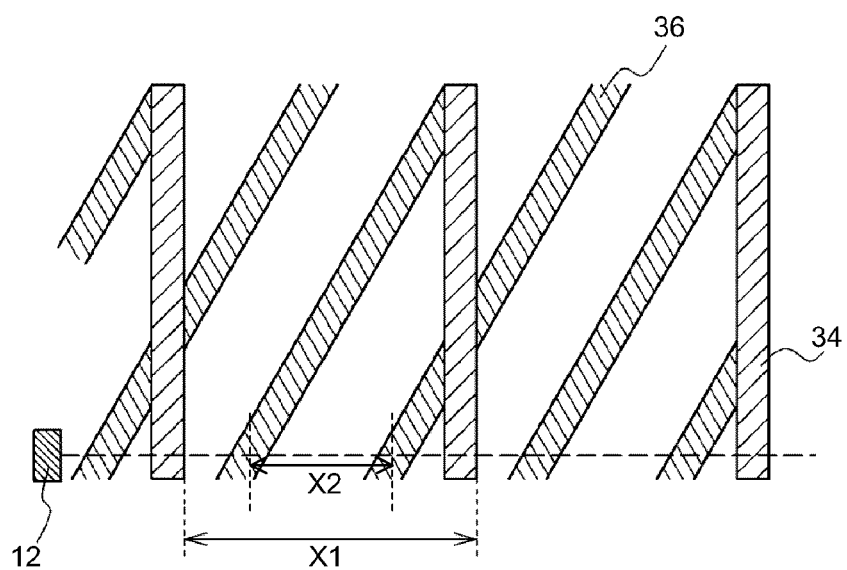
FIGS. 3A and 3B are exemplary enlarged views of an internal area of the magnetic disk of FIG. 2 in the embodiment.
Figure 3B:
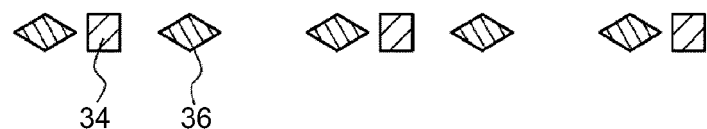

FIG. 3A is an enlarged view of an internal area of the magnetic disk 18, which illustrates an arrangement of the first servo pattern 34 and the second servo pattern 36. The first servo pattern 34 extends in a radial direction of the magnetic disk 18. That is, the first servo pattern 34 is provided radially from the inside of the magnetic disk 18. The second servo pattern 36 is a pattern that has a spiral shape. The first servo pattern 34 and the second servo pattern 36 are formed to intersect with each other. An interval X1 between the first servo patterns 34 is two times larger than an interval X2 between the second servo patterns 36, for example. FIG. 3B is a waveform diagram of the first servo pattern 34 and the second servo pattern 36 read by the head 12 on the trace (broken line portion of FIG. 3A) to a circumferential direction and demodulated, when the magnetic disk 18 is rotated.

Figure 4:
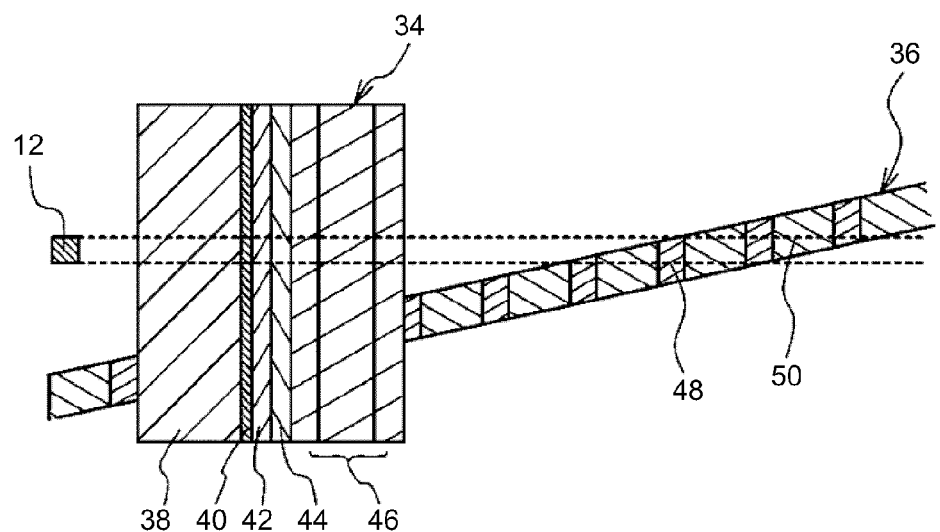
FIG. 4 is an exemplary schematic diagram for explaining a data format recorded in a first servo pattern and a second servo pattern in the embodiment.

Next, a data format of data recorded in the first servo pattern 34 and the second servo pattern 36 is described with reference to FIG. 4. The first servo pattern 34 includes a preamble 38, a servo sync mark 40, sector data 42, a gray code 44, and a phase burst 46.

The preamble 38 is used when an amplitude is made to be constant by adjusting an amplification factor of a reproduction output before the sector data or servo data such as the gray code is read. The servo sync mark 40 is used to find a head of the servo data. The sector data 42 has sector number information, and indicates what number the servo data is within one track. The gray code 44 records track number information by a gray code. The phase burst 46 has relative position information of the head 12 with respect to a track, and is used to correctly position the head 12 in the center of a target track.

The second servo pattern 36 includes a sync mark 48 and a burst 50. The sync mark 48 is used as standard timing information in a circumferential direction. In the burst 50, amplitude position timing thereof indicates a position of the second servo pattern 36. The burst 50 is used to convert a temporal difference between standard timing obtained by the sync mark 48 and peak position timing of the burst 50 into a radial direction position error amount to calculate relative position information of the second servo pattern 36, and position the head 12 in the center of the target track.

As described above, since the first servo pattern 34 includes the gray code 44, an absolute position on the magnetic disk 18 can be specified. Meanwhile, since the second servo pattern 36 does not include the gray code 44, an absolute position on the magnetic disk 18 cannot be specified, and only a relative position on the magnetic disk 18 can be specified. That is, the first servo pattern 34 includes absolute position information on the magnetic disk 18, and the second servo pattern 36 includes relative position information on the magnetic disk 18.

Referring back to FIG. 1, the control board 90 includes a hard disk controller 20, a data buffer 22, a memory 24 as a recording module, a servo controller 26, a read/write channel 28, and a micro processing unit (MPU) 30. The hard disk controller 20, the memory 24, the servo controller 26, the read/write channel 28, and the MPU 30 are connected to each other by a system bus 32.

The hard disk controller 20 exchanges various commands and data with a host system, such as a computer, which is a host of the magnetic disk apparatus. The data buffer 22 temporarily stores data from the host system.

The memory 24 includes a volatile memory, such as a random access memory (RAM), and a nonvolatile memory, such as a flash read only memory (ROM). The RAM is a work memory that is used when the MPU 30 executes a control process. In the flash ROM, a control program that is executed by the MPU 30 is previously stored. Further, the flash ROM may store standard position information of the second servo pattern 36 or record information of the third servo pattern, which will be described in detail below.

The servo controller 26 controls the voice coil motor 14 or the spindle motor 16, based on an instruction from the MPU 30.

The read/write channel 28 functions as a write modulating module and a read demodulating module.

Figure 5:
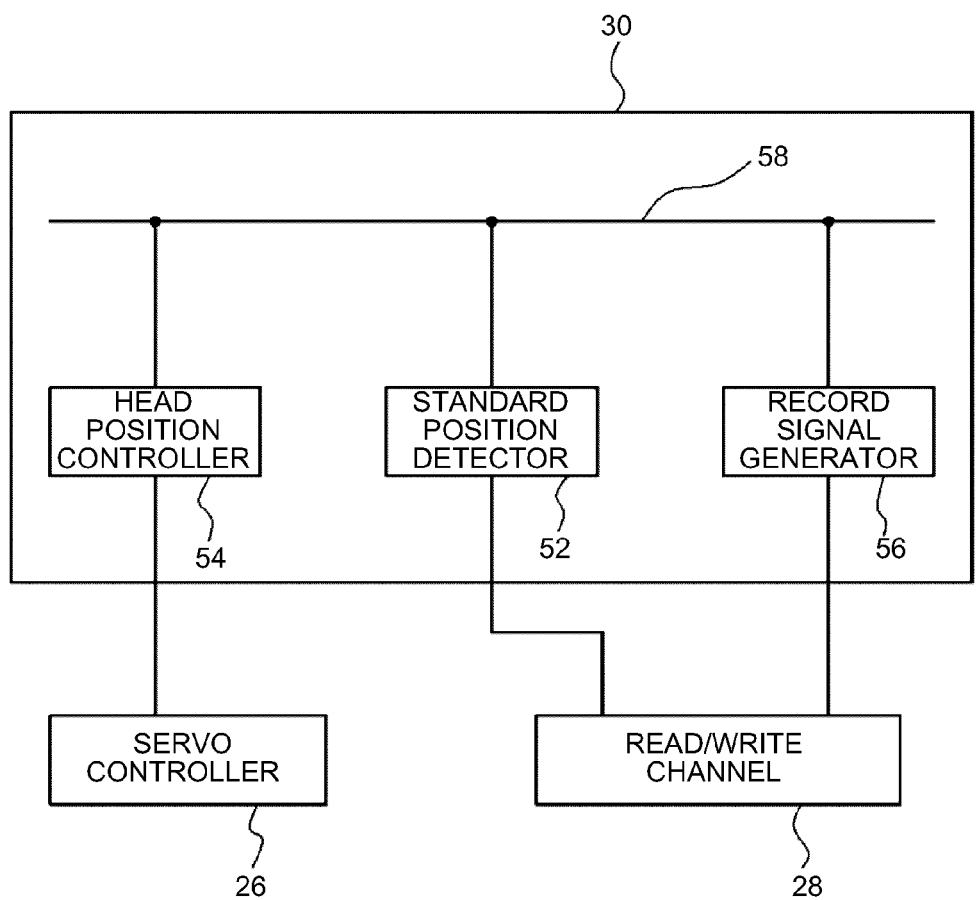
FIG. 5 is an exemplary block diagram of an MPU of FIG. 1 in the embodiment.

The MPU 30 wholly controls the magnetic disk apparatus 100. As illustrated in FIG. 5, the MPU 30 includes a standard position detector 52, a head position controller 54, and a record signal generator 56. The standard position detector 52, the head position controller 54, and the record signal generator 56 are connected to each other by a system bus 58. The standard position detector 52, the head position controller 54, and the record signal generator 56 are performed when the MPU 30 reads and executes the control program previously stored in the flash ROM of the memory 24.

The standard position detector 52 calculates a standard position of the second servo pattern 36 from a positional relationship between the first servo pattern 34 and the second servo pattern 36 that are read by the head 12 and demodulated. A specific method of calculating a standard position will be described in detail below. The head position controller 54 controls to position the head 12 in a desired position on the magnetic disk 18. For example, the head position controller 54 controls to position the head 12 in a target position on the magnetic disk 18, using the standard position calculated by the standard position detector 52 and the first and second servo patterns 34 and 36. The record signal generator 56 generates a record signal to record the third servo pattern having absolute position information on the magnetic disk 18 at the target position, by the head 12 controlled to be positioned in the target position.

Next, a method of calculating the standard position of the second servo pattern 36 will be described with reference to FIGS. 6 and 7.

First, the MPU 30 instructs the servo controller 26 to control driving of the spindle motor 16 or the voice coil motor 14, and positions the head 12 in the target track in the first servo pattern 34 (S10). At this time, the MPU 30 can position the head 12 in the target track using the information such as the gray code 44 or the phase burst 46 of the first servo pattern 34.

After a predetermined time is passed from detection of the servo sync mark 40 included in the first servo pattern 34, the MPU 30 opens a spiral demodulation window 60 for a certain time period (S12). Next, the MPU 30 determines whether the second servo pattern 36 can be normally detected within the spiral demodulation window 60 (S14).

When it is determined in S14 that the second servo pattern 36 cannot be normally detected, the MPU 30 controls driving of the spindle motor 16 or the voice coil motor 14, and shifts the head 12 in a radial direction of the magnetic disk 18 by a predetermined offset amount (S16). The offset amount may be previously recorded in the flash ROM of the memory 24 of FIG. 1. After a predetermined time from the detection of the servo sync mark 40 included in the first servo pattern 34, the MPU 30 opens the spiral demodulation window 60 for a constant time (S12) again. Next, the MPU 30 determines whether the second servo pattern 36 can be normally detected within the spiral demodulation window 60 (S14). The predetermined time until the spiral demodulation window 60 is opened after the servo sync mark 40 is detected is not varied.

Figure 7:
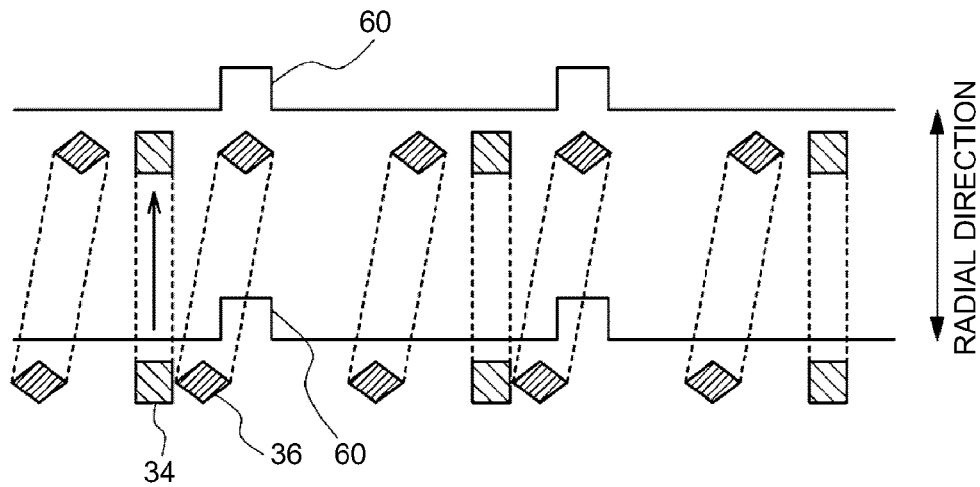
FIG. 7 is an exemplary schematic diagram for explaining the calculation of the standard position of the second servo pattern in the embodiment.

The intervals of the first servo patterns 34 and the second servo pattern 36 in a circumferential direction differ from each other depending on the radial positions thereof, as illustrated in FIG. 7. Therefore, the MPU 30 can normally detect the second servo pattern 36 at any position, by repetitively executing the processes of S12 to S16. The normal detection of the second servo pattern 36 is equivalent to a detection of a peak position in the waveform diagram of the demodulated second servo pattern 36. When it is determined in S14 that the second servo pattern 36 can be normally detected, the MPU 30 sets a position of the detected second servo pattern 36 as a standard position of the second servo pattern 36 (hereinafter, simply referred to as standard position) (S18).

Figure 8:
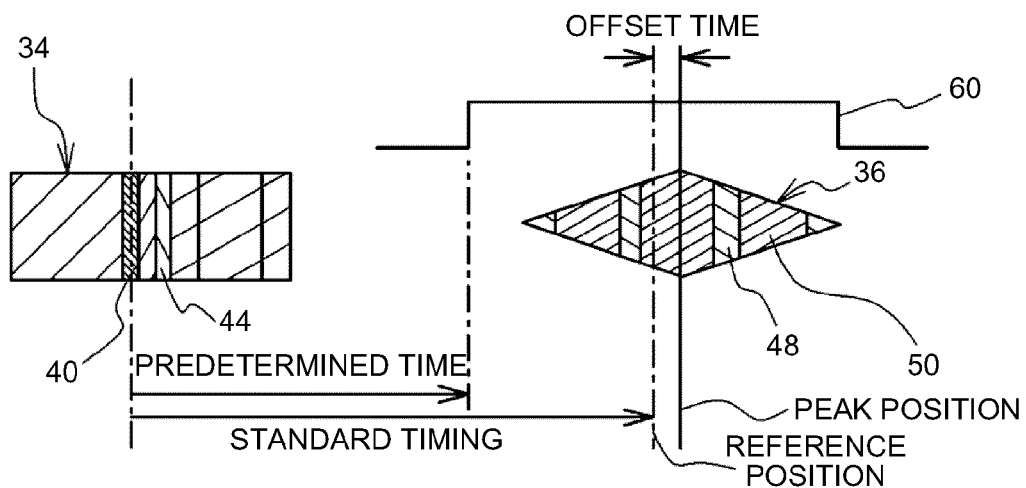
FIG. 8 is an exemplary schematic diagram for explaining calculation of an absolute position of the standard position of the second servo pattern on the magnetic disk in the embodiment.

By the standard position that is calculated in S18, an absolute position on the magnetic disk 18 may be specified, which will be described below with reference to FIG. 8. FIG. 8 illustrates a case where the MPU 30 can normally detect the second servo pattern 36.

As illustrated in FIG. 8, for example, a central position of the spiral demodulation window 60, which is opened after the predetermined time from the detection of the servo sync mark 40 included in the first servo pattern 34, is determined as a reference position, and a time until the reference position is referred to as standard timing. From the offset time from the reference position to the peak position of the second servo pattern 36 detected in the spiral demodulation window 60, an offset amount between the reference position and the peak position is calculated. In this case, if the peak position is set as the standard position of the second servo pattern 36, the offset position from the first servo pattern 34 at the standard position can be calculated by adding the offset amount to the offset position from the first servo pattern 34 of the reference position. That is, if the offset amount of the reference position and the standard position (peak position) is calculated, a positional relationship between the standard position and the position of the first servo pattern 34 is uniformly determined. Accordingly, an absolute position on the magnetic disk 18 of the standard position can be calculated by adding the offset position from the first servo pattern 34 of the standard position to an absolute position of the first servo pattern 34 on the magnetic disk 18. In FIG. 8, the central position of the spiral demodulation window 60 is set as the reference position, and the time until the reference position is set as the standard timing. However, the reference position (standard timing) may be arbitrarily determined.

Figure 9:
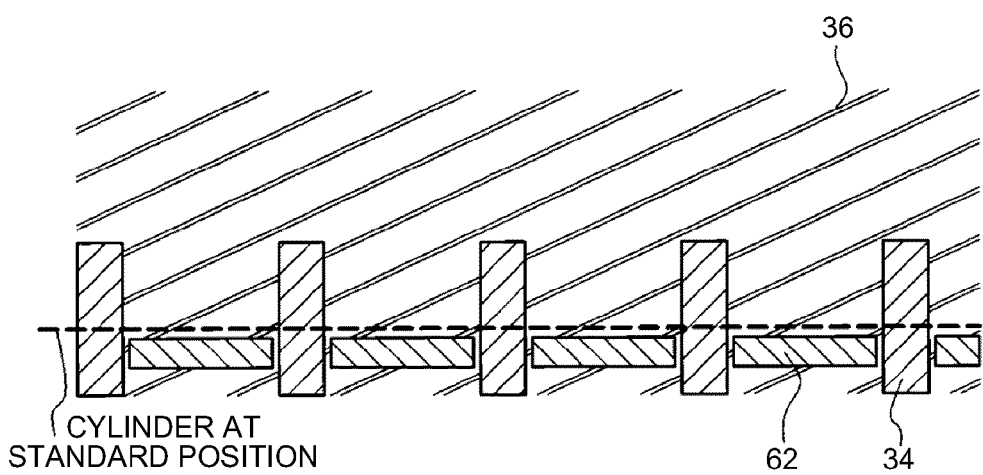
FIG. 9 is an exemplary schematic diagram for explaining a system area provided in the magnetic disk in the embodiment.

Referring back to FIG. 6, the MPU 30 records information on the standard position calculated in S18, for example, cylinder position information, in the standard position (S20). A record destination may be a system area 62 that is provided between the first servo patterns 34 in the internal area of the magnetic disk 18, as illustrated in FIG. 9. As such, if the system area 62 is provided in the internal area of the magnetic disk 18, the second servo pattern 36 can be suppressed from being destroyed, and the third servo pattern can be formed. The system area 62 may be provided in the external area of the magnetic disk 18 as well as the internal area thereof. The information on the standard position may be recorded in the flash ROM of the memory 24 without providing the system area 62 in the magnetic disk 18.

In this case, the MPU that executes the process of S10 corresponds to the head position controller 54 in FIG. 5. The MPU that executes the processes of S12 to S18 corresponds to the standard position detector 52 in FIG. 5.

Figure 10:
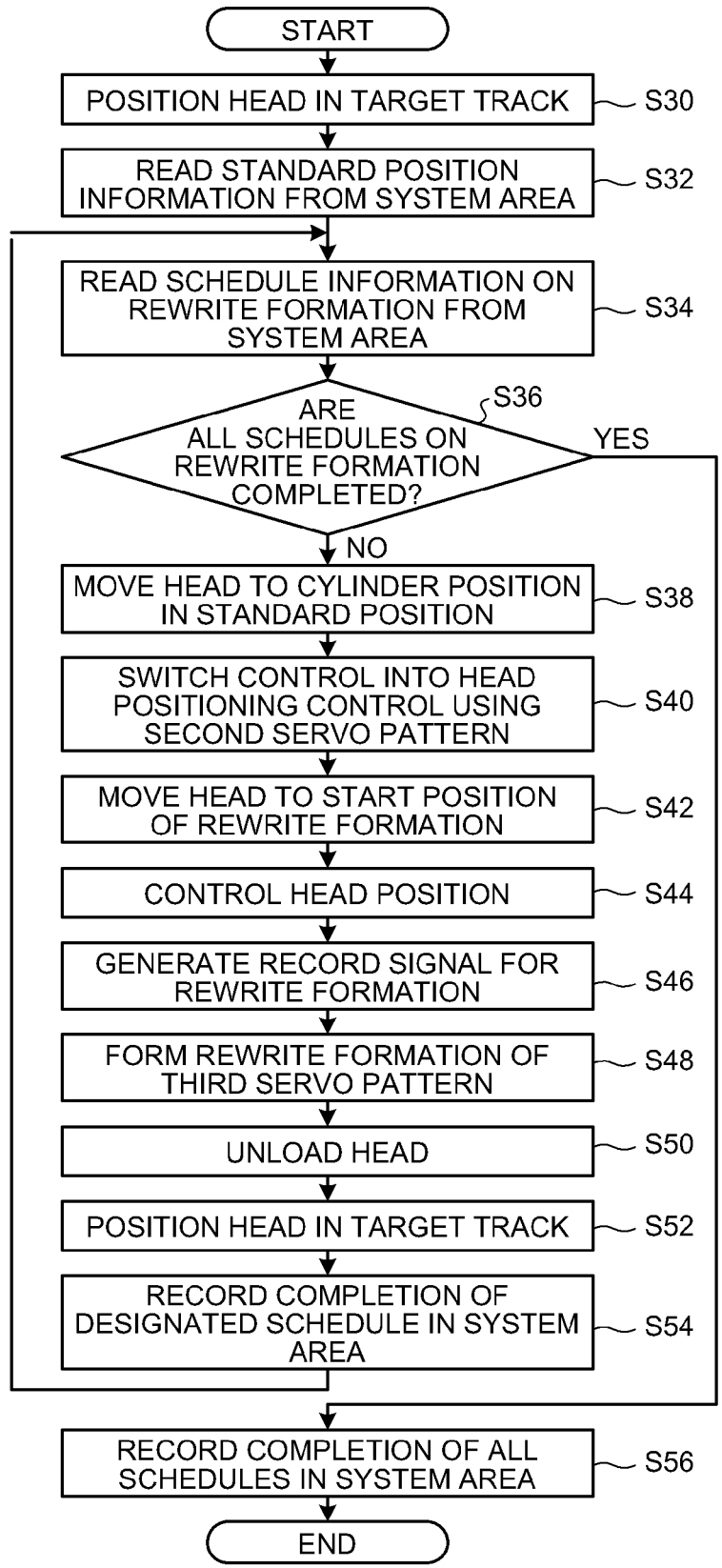
FIG. 10 is an exemplary flowchart of rewrite formation of a third servo pattern in the embodiment.

Next, rewrite formation of the third servo pattern (having absolute position information on the magnetic disk 18) that is performed on the entire surface of the magnetic disk 18 will be described with reference to FIGS. 10 and 11.

Figure 6:
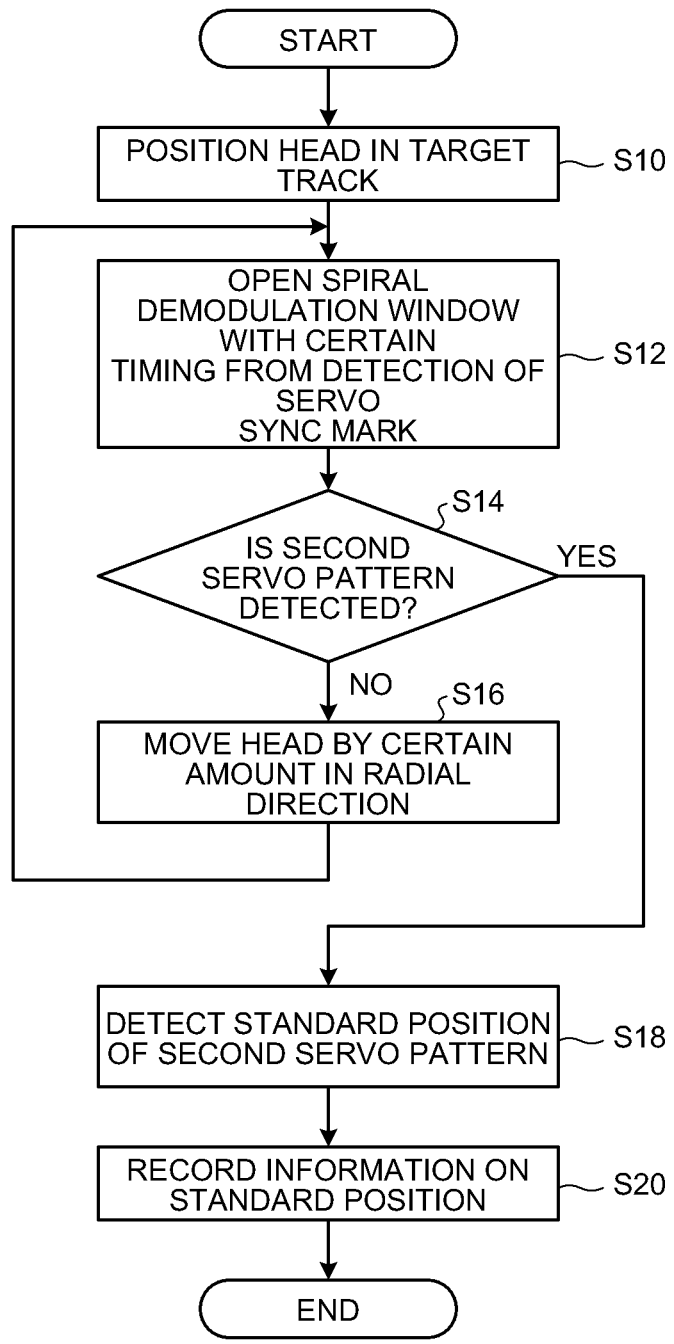
FIG. 6 is an exemplary flowchart of calculation of a standard position of the second servo pattern in the embodiment.

First, the processes of the flowchart of FIG. 6 are executed, and the information on the standard position is recorded in the system area 62. Information of the number of times of rewrite formation that is executed to form the third servo pattern and the cylinder position in each rewrite formation is scheduled and recorded in the system area 62. In the embodiment, the third servo pattern is formed by executing the rewrite formation for three times.

First, the first rewrite formation will be described. The MPU 30 controls driving of the spindle motor 16 or the voice coil motor 14, and positions the head 12 in the target track in the first servo pattern 34 (S30). At this time, the MPU 30 can position the head 12 in the target track using the information such as the gray code 44 or the phase burst 46 of the first servo pattern 34.

Next, the MPU 30 reads the information on the cylinder position in the standard position that is recorded in the system area 62 (S32). The MPU 30 reads schedule information on the rewrite formation that is recorded in the system area 62 (S34).

Next, the MPU 30 determines whether all schedules on the rewrite formation are completed (S36). In a case of the first rewrite formation, since all schedules on the rewrite formation are not completed, the MPU 30 proceeds to S38. The MPU 30 controls driving of the spindle motor 16 or the voice coil motor 14, and moves the head 12 to the cylinder position in the standard position read from the system area 62 (S38). Even at this time, the information such as the gray code 44 or the phase burst 46 of the first servo pattern 34 may be used.

Next, the MPU 30 switches the positioning control of the head 12 from the positioning control using the first servo pattern 34 to the positioning control using the second servo pattern 36 (S40). Next, the MPU 30 moves the head 12 to a start position of the rewrite formation, based on the schedule of the rewrite formation read from the system area 62 (S42). In the case of the first rewrite formation, since the rewrite formation starts from the cylinder position in the standard position, the movement of the head 12 through S42 is not performed.

Figure 11A:
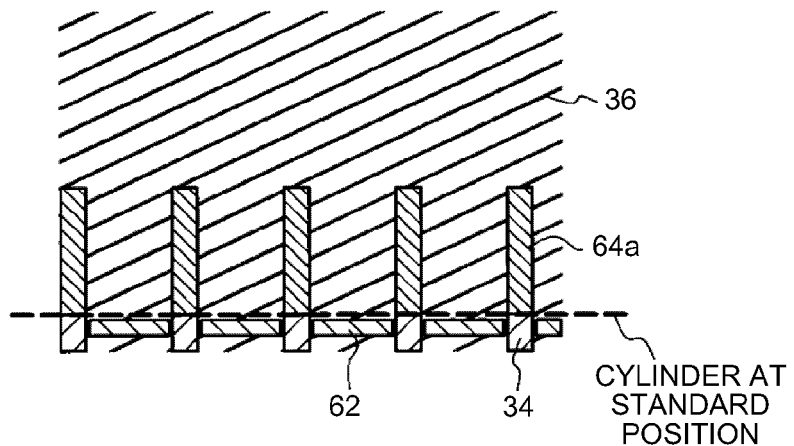
FIGS. 11A to 11C are exemplary schematic diagrams for explaining the rewrite formation of the third servo pattern in the embodiment.

Next, the MPU 30 controls driving of the spindle motor 16 or the voice coil motor 14, based on the cylinder position information in the first rewrite formation schedule read from the system area 62, and performs positioning control of the head 12 (S44). At this time, the positioning control of the head 12 is performed using the second servo pattern 36. While the positioning control of the head 12 is performed, the MPU 30 generates a record signal for rewrite formation of the third servo pattern 64 (S46). The record signal for rewrite formation of the third servo pattern 64 is transmitted to the head 12 through the read/write channel 28. As a result, as illustrated in FIG. 11A, a third servo pattern 64a is formed at the target position where the head 12 is moved (S48).

As described above, the second servo pattern 36 has the relative position information on the magnetic disk 18, and the standard position of the second servo pattern 36 has the absolute position information. Accordingly, the positioning control of the head 12 is performed from the standard position of the second servo pattern 36 using the second servo pattern 36 to specify the absolute position on the magnetic disk 18, thereby performing the positioning control of the head 12. As a result, an absolute position of the third servo pattern 64 to be formed on the magnetic disk 18 on the magnetic disk 18 can be specified. That is, the third servo pattern 64 can have absolute position information on the magnetic disk 18.

After the first rewrite formation is completed, the MPU 30 stops the positioning control using the second servo pattern 36, controls driving of the spindle motor 16 or the voice coil motor 14, and moves the head 12 to the inside of the magnetic disk 18. Then, the MPU 30 unloads the head 12 to the outside of the magnetic disk 18 (S50).

The MPU 30 uses the information such as the gray code 44 or the phase burst 46 of the first servo pattern 34, to position the head 12 in the target track in the first servo pattern 34 again (S52). The reason why the head 12 is temporarily unloaded to the outside of the magnetic disk 18 in S50 is because the positioning control of the head 12 is switched from the positioning control using the second servo pattern 36 to the positioning control using the first servo pattern 34.

The MPU 30 records, in the system area 62, information indicating that the first rewrite formation is completed (S54).

Next, the second rewrite formation will be described. The MPU 30 reads, from the system area 62, the schedule information on the rewrite formation and the information indicating that the first rewrite formation is completed, which is recorded in S54 (S34).

Next, the MPU 30 determines whether all schedules on the rewrite formation are completed (S36). Since this rewrite formation is the second rewrite formation and the information indicating that the first rewrite formation is completed among the three schedules on the rewrite formation is read in S34, the MPU 30 determines that all schedules on the rewrite formation are not completed, and proceeds to S38. The MPU 30 controls driving of the spindle motor 16 or the voice coil motor 14, and moves the head 12 to the cylinder position in the standard position (S38). At this time, the information such as the gray code 44 or the phase burst 46 of the first servo pattern 34 may be used.

Next, the MPU 30 switches the positioning control of the head 12 from the positioning control using the first servo pattern 34 to the positioning control using the second servo pattern 36 (S40). Next, the MPU 30 moves the head 12 to a second rewrite formation start position, based on the rewrite formation schedule information and the information indicating that the first rewrite formation is completed, which are read from the system area 62 (S42). At this time, the positioning control of the head 12 is performed using the second servo pattern 36.

Figure 11B:
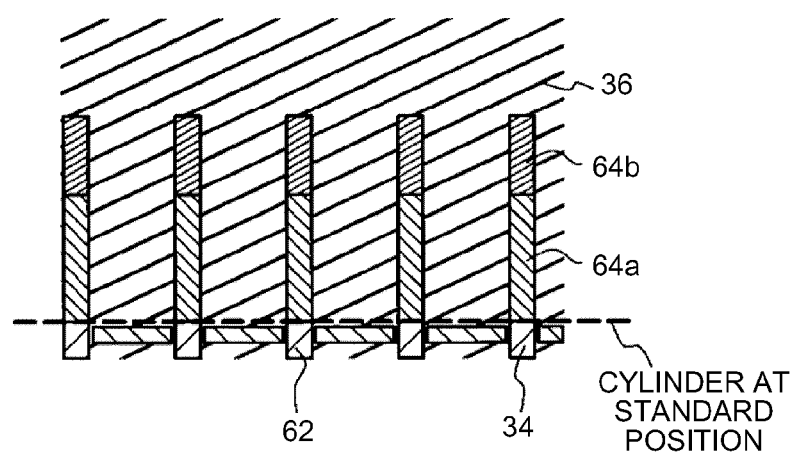

Next, the MPU 30 controls driving of the spindle motor 16 or the voice coil motor 14, based on the cylinder position information in the second rewrite formation read from the system area 62, and performs the positioning control of the head 12 (S44). At this time, the positioning control of the head 12 is performed using the second servo pattern 36. While the positioning control of the head 12 is performed, the MPU 30 generates a record signal for rewrite formation of the third servo pattern 64 (S46). The record signal for rewrite formation of the third servo pattern 64 is transmitted to the head 12 through the read/write channel 28. As a result, as illustrated in FIG. 11B, a third servo pattern 64b is formed at the target position where the head 12 is moved (S48).

After the second rewrite formation is completed, the MPU 30 stops the positioning control using the second servo pattern 36 and moves the head 12 to the inside of the magnetic disk 18. Then, the MPU 30 unloads the head 12 to the outside of the magnetic disk 18 (S50).

The MPU 30 positions the head 12 in the target track in the first servo pattern 34 again (S52), and records, in the system area 62, information indicating that the second rewrite formation is completed (S54).

Figure 11C:
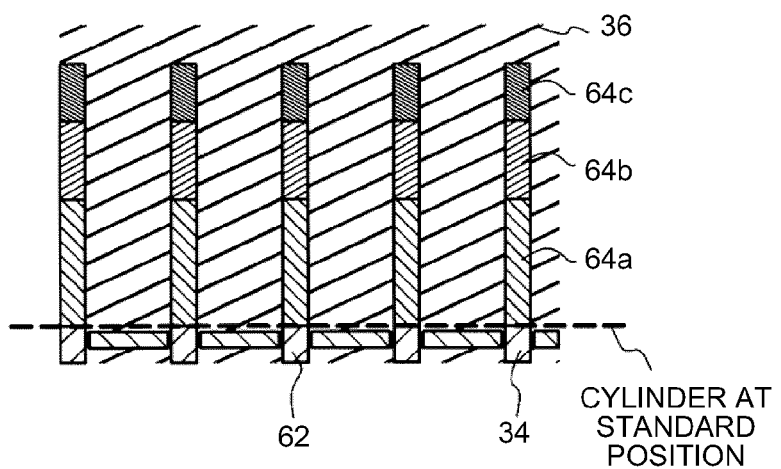

Next, the third rewrite formation is performed using the same method as the second rewrite formation. FIG. 11C illustrates a third servo pattern 64c of when the third rewrite formation is completed. In S54, the MPU 30 records information indicating that the third rewrite formation is completed.

Next, the MPU 30 reads, from the system area 62, the schedule information on the rewrite formation and the information indicating that the third rewrite formation is completed (S34), and determines whether all schedules on the rewrite formation are completed (S36). The MPU 30 determines that all schedules on the rewrite formation are completed based on the schedule information on the rewrite formation and the information indicating that the third rewrite formation is completed, which are read from the system area 62, and proceeds to S56.

Finally, the MPU 30 records, in the system area 62, information indicating that all schedules on the rewrite formation are completed (S56), and completes the process.

The MPU that executes the processes of S30, S38, S42, S44, S50, and S52 corresponds to the head position controller 54 in FIG. 5. The MPU that executes the process of S46 corresponds to the record signal generator 56 in FIG. 5.

As described above, according to the embodiment, from the positional relationship between the first servo pattern 34 where the absolute position on the magnetic disk 18 can be specified and the second servo pattern 36 where the relative position can be specified, the standard position of the second servo pattern 36 where the absolute position on the magnetic disk 18 can be specified can be calculated. After the head 12 is positioned in the standard position of the second servo pattern 36 using the absolute position information of the first servo pattern 34, the positioning control is performed using the information of the relative position of the second servo pattern from the standard position of the second servo pattern 36. As a result, the positioning control of the head 12 can be performed by specifying the absolute position on the magnetic disk 18. While the positioning control is performed, the data is written by the head 12 based on the record signal generated by the MPU 30, and the third servo pattern 64 where the absolute position on the magnetic disk 18 can be specified can be formed in the target position of the magnetic disk 18. The third servo pattern 64 can be used as the servo pattern used at the time of the positioning control of the head 12, when the user data is recorded and reproduced. As such, according to the embodiment, the third servo pattern 64 can be easily formed in the absolute position on the magnetic disk 18, by the head 12 of the magnetic disk apparatus 100. The first servo pattern 34 may be used as the servo pattern of when the user data is recorded and reproduced or may not be used.

As described above in the related art, when the third servo pattern 64 used in recording and reproducing the user data is formed on the entire surface of the magnetic disk 18 using the external STW equipment, a large amount of time is needed, which results in increasing an equipment investment cost of the external STW equipment. However, according to the embodiment, in the external STW equipment, only the first servo pattern 34 and the second servo pattern 36 are formed. Since the first servo pattern 34 is formed only in the internal area of the magnetic disk 18, a time needed to form the first servo pattern 34 is suppressed. Since the second servo pattern 36 as a spiral servo pattern does not have absolute position information on the magnetic disk 18, the second servo pattern 36 can be formed in a short time. In addition, the third servo pattern 64 is formed by the magnetic disk apparatus 100. Accordingly, according to the embodiment, a use time of the external STW equipment of when the third servo pattern 64 is formed on the entire surface of the magnetic disk 18 can be suppressed. As a result, use efficiency of the external STW equipment can be improved, and the equipment investment cost of the external STW equipment can be reduced.

Further, the standard position information of the second servo pattern 36 is recorded in the system area 62. As a result, even when the magnetic disk apparatus 100 is restarted after supply of power to the magnetic disk apparatus is stopped, the standard position of the second servo pattern 36 where the absolute position on the magnetic disk 18 is specified can be accurately obtained. The rewrite formation information of the third servo pattern 64 is recorded in the system area 62. As a result, even when supply of power to the magnetic disk apparatus 100 is stopped suddenly due to a power failure, after the magnetic disk apparatus 100 restarts, an area where the third servo pattern 64 is completely formed can be grasped, and the formation of the third servo pattern 64 can be restarted continuously from the area where the third servo pattern is formed.

In the embodiment, in the detection of the standard position of the second servo pattern 36, as illustrated in FIGS. 6 and 7, when the second servo pattern 36 cannot be normally detected in the spiral demodulation window 60, the head 12 is shifted in the radial direction, and the detection of the second servo pattern 36 is repetitively performed. However, the embodiment is not limited thereto. For example, the detection of the second servo pattern 36 may be repetitively performed by varying the time until the spiral demodulation window 60 is opened after the servo sync mark 40 is detected without changing the position of the head 12 in the radial direction.

Figure 12:
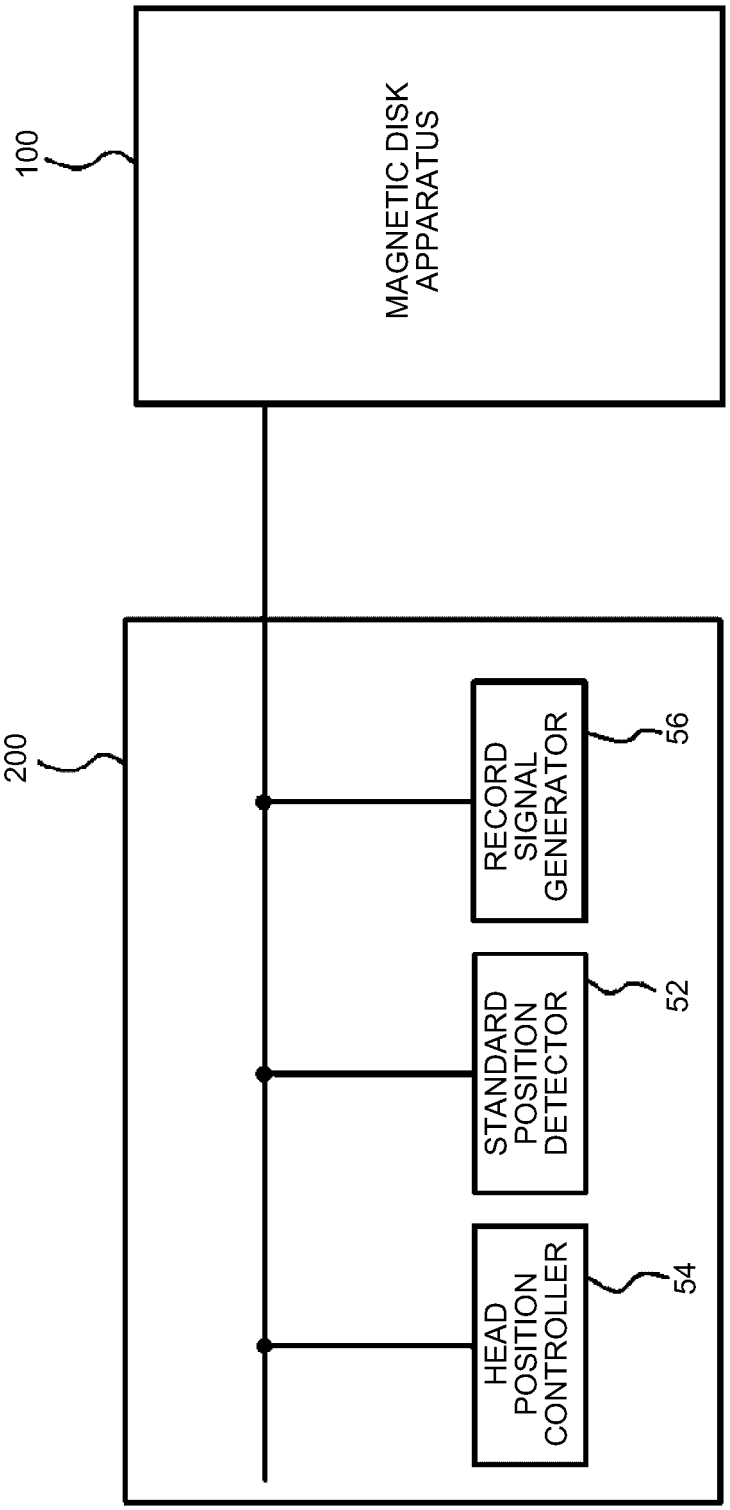
FIG. 12 is an exemplary block diagram of a servo pattern formation control apparatus in the embodiment.

As illustrated in FIG. 12, a servo pattern formation control apparatus 200 that includes the standard position detector 52, the head position controller 54, and the record signal generator 56 may be different from the magnetic disk apparatus 100. Even in this case, the same effect as the embodiment can be obtained by connecting the servo pattern formation control apparatus 200 to the magnetic disk apparatus 100.

As described above, according to the embodiment, the standard position of the second servo pattern where the absolute position on the recording medium is specified can be calculated from the positional relationship between the first servo pattern and the second servo pattern. The record reproducing head is controlled to be positioned in the target position using the absolute position information of the first servo pattern, the absolute position information of the standard position, and the relative position information of the second servo pattern. As a result, the absolute position of the target position where the record reproducing head is positioned on the recording medium can be specified. In addition, since the record signal to record the third servo pattern is generated and transmitted to the record reproducing head, the third servo pattern that has the absolute position information on the recording medium can be formed at the target position. That is, the third servo pattern can be easily formed at the absolute position on the recording medium, by the record reproducing head of the information storage apparatus.

Further, according to the embodiment, the servo pattern can easily be formed in the absolute position on the recording medium by the record reproducing head of the information storage apparatus itself.

The information storage apparatus and the servo pattern formation control apparatus that are described in this specification can form the servo pattern at the absolute position on the recording medium, by the record reproducing head of the information storage apparatus. Further, the recording medium that is described in this specification enables the servo pattern to be easily formed at the absolute position on the recording medium, when the servo pattern is formed by the record reproducing head of the information storage apparatus.

The above-described embodiment is the preferred embodiment of the invention. However, the invention is not limited thereto, and various modifications can be made without departing from the spirit and scope of the invention.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information storage apparatus, comprising:
a recording medium configured to include a first servo pattern having absolute position information on the recording medium and a second servo pattern having relative position information on the recording medium;
a record reproducing head configured to record information on and reproduce information from the recording medium;
a standard position detector configured to calculate a standard position of the second servo pattern where an absolute position on the recording medium is specified, from a positional relationship between the first servo pattern and the second servo pattern;
a head position controller configured to position the record reproducing head in a target position on the recording medium, using the absolute position information of the first servo pattern, the standard position, and the relative position information of the second servo pattern; and
a record signal generator configured to generate a record signal to record a third servo pattern having absolute position information on the recording medium in the target position by the record reproducing head.

2. The information storage apparatus of claim 1,
wherein, after a predetermined time is passed from detection of a sync mark included in the first servo pattern at a predetermined position by the record reproducing head positioned at the predetermined position using the absolute position information of the first servo pattern, the standard position detector detects the second servo pattern for a time period, and sets a position where the second servo pattern is detected as the standard position of the second servo pattern, and
when the second servo pattern is not detected, the standard position detector shifts the record reproducing head in a radial direction of the recording medium from the predetermined position, and detects the second servo pattern again.

3. The information storage apparatus of claim 1,
wherein, after a predetermined time is passed from detection of a sync mark included in the first servo pattern at a predetermined position by the record reproducing head positioned in the predetermined position using the absolute position information of the first servo pattern, the standard position detector detects the second servo pattern for a time period, and sets a position where the second servo pattern is detected as the standard position of the second servo pattern, and
when the second servo pattern is not detected, the standard position detector does not change the position of the record reproducing head, and detects the second servo pattern for the time period after a time that differs from the predetermined time is passed.

4. The information storage apparatus of claim 1,
wherein information on the standard position and formation of the third servo pattern is recorded in a system area on the recording medium, and
the third servo pattern is formed based on the information that is recorded in the system area.

5. The information storage apparatus of claim 1, further comprising:
a recording module configured to record information on the standard position and formation of the third servo pattern, and
the third servo pattern is formed based on the information that is recorded in the recording module.

6. The information storage apparatus of claim 1,
wherein the first servo pattern is formed radially in a radial direction of the recording medium,
the second servo pattern is formed spirally to intersect the first servo pattern, and
intervals of the first and second servo patterns in a circumferential direction of the recording medium are different depending on positions of the intervals in the radial direction of the recording medium.

7. A servo pattern formation control apparatus, comprising:
a standard position detector configured to calculate, from a positional relationship between a first servo pattern having absolute position information on a recording medium and a second servo pattern having relative position information on the recording medium, which are formed on the recording medium, a standard position of the second servo pattern where an absolute position on the recording medium is specified;
a head position controller configured to position a record reproducing head, which records information on and reproduces information from the recording medium, in a target position on the recording medium, using the absolute position information of the first servo pattern, the standard position, and the relative position information of the second servo pattern; and
a record signal generator configured to generate a record signal to record a third servo pattern having absolute position information on the recording medium in the target position by the record reproducing head.

8. A recording medium, comprising:
a first servo pattern having absolute position information on the recording medium; and
a second servo pattern having relative position information on the recording medium and a spiral shape.

* * * * *